April 28, 1953
F. T. BARNES
2,636,780
DEVICE FOR ATOMIZING GREASE
Filed Aug. 17, 1950
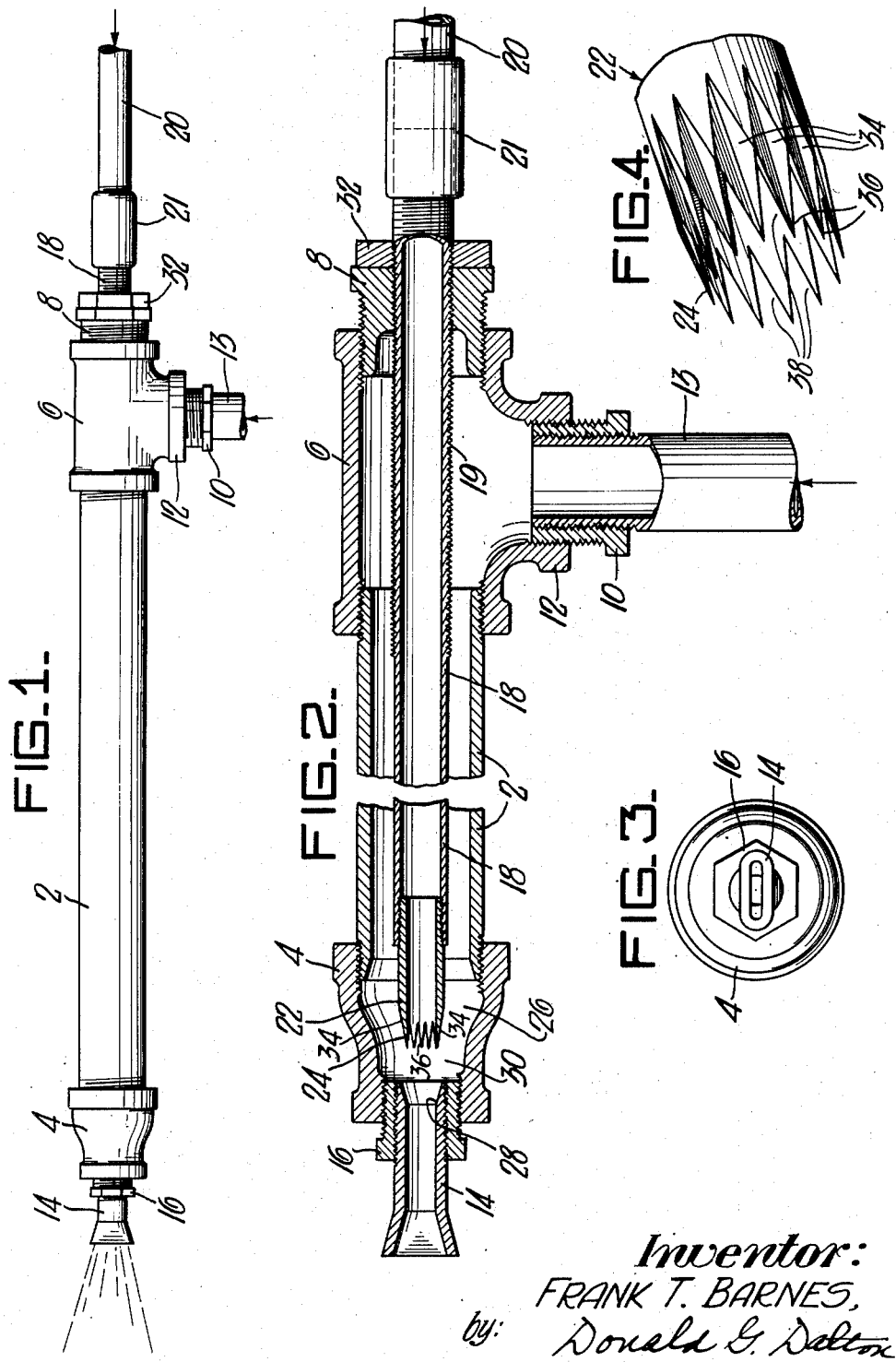
Inventor:
FRANK T. BARNES,
by: Donald G. Dalton
his Attorney.

Patented Apr. 28, 1953

2,636,780

UNITED STATES PATENT OFFICE 2,636,780

DEVICE FOR ATOMIZING GREASE

Frank T. Barnes, Gary, Ind.

Application August 17, 1950, Serial No. 180,023

1 Claim. (Cl. 299—140)

The present invention relates to devices for atomizing grease and more particularly to a grease gun wherein grease is atomized for spraying onto surfaces requiring lubrication.

Prior to my invention, the application of heavy grease lubricant on the moving parts of machinery, such as gears and pinions, by conventional methods was inefficient and wasteful. The usual procedure was to use a bucket and dipper which resulted in a greater percentage of grease being spilled than was actually applied onto the gear teeth. Not only did the spilled grease constitute needless waste but it also created a safety hazard when it spilled onto the floor of the mill.

It is, accordingly, an object of my invention to provide a grease gun which atomizes grease for spraying onto surfaces requiring lubrication.

This and other objects will be more apparent after referring to the following specification and attached drawings, in which:

Figure 1 is a side elevation;

Figure 2 is a longitudinal sectional view;

Figure 3 is an end view of the nozzle end of the invention; and

Figure 4 is an enlarged perspective view of the discharge end of the grease nipple.

Referring more particularly to the drawings, reference numeral 2 indicates a cylindrical air barrel which has a reducing fitting 4 attached to its discharge end. The other end of barrel 2 is threaded into the run of a T fitting 6. A tapped and threaded bushing 8 is threaded into the other end of the run of T 6. A similar bushing 10 is attached to the branch 12 of the T 6. A compressed-air supply line 13 is connected to the branch 12 by means of the bushing 10 to introduce compressed air into the air barrel 2. A tapered nozzle 14 is fitted into the reduced end of reducer 4 by means of a standard drilled and tapped bushing 16. A grease tube 18 is disposed within air barrel 2 and extends coaxially therewith with its one end terminating short of the rear end of nozzle 14. The other end of the grease tube 18 is threaded exteriorly along a substantial distance as at 19 and extends through T 6 and bushing 8. The projecting threaded end of the grease tube 18 is connected to a grease supply line 20 by means of a coupling 21. Supply line 20 is connected to a remote source of grease supply (not shown) which is delivered under pressure. A nipple 22 is attached to the front end of the grease tube 18. The front of the nipple is chamfered as at 24 to streamline the air stream and prevent turbulence in the mixing chamber. For the same reason, the rear end of the nozzle 14 is chamfered-reamed as at 28.

A series of circumferentially disposed saw teeth 34 is formed on the discharge end 24 of the nipple 22. The purpose of the saw teeth is to support the grease column at the points 36 of the saw teeth while permitting the air flow to cut into the grease between the teeth as at 38. This will form flutes in the grease column as it emerges from the nipple 22 and prevent the air from breaking off slugs of grease. By providing saw teeth at the mouth of the nipple 22, there is obtained a gradual exposure of the grease to the air flow as compared to the instantaneous exposure which occurs when the nipple mouth is merely chamfered.

The rear end of the grease tube 18 is threaded through the bushing 8. The long threaded portion 19 makes it possible to advance or withdraw the grease tube 18 to adjust the gap 30 between the rear end of the nozzle 14 and the discharge end of the nipple 22. A lock nut 32 is provided around the projecting end of tube 18 adjacent the bushing 8 to lock and maintain the tube in position and prevent gap 30 from getting out of adjustment.

In operation, grease under pressure is fed into the grease tube 18 from whence it is extruded through nipple 22 into the mixing chamber 26. At the same time compressed air is introduced through the supply line 13 and barrel 2 into the mixing chamber adjacent the extruded grease. The air, which is traveling at a considerably higher velocity than the grease, comes in contact with the projecting extruded grease with a somewhat scouring action. This scouring action tends to break off small particles of grease which the air carries in suspension through the nozzle and sprays on the surface to be lubricated. The flow of grease and compressed air is regulated by means of valves (not shown) in the lines 20 and 13. It should be noted that the air stream flowing along the extruded grease tends not only to scour but also to draw the grease to a point. Thus, by regulation of the grease and air flow, control of the density of the spray can be achieved.

Thus, it will be seen that a workman can aim the grease gun of my invention in the direction of any desired surface to be lubricated and easily and efficiently perform the lubricating by spraying the atomized grease onto the surface. This spraying can be done at a distance of several feet which makes it unnecessary for the workman to approach dangerously close to the moving parts of the machinery requiring lubrication.

While one embodiment of my invention has been shown and described, it will be apparent that other adaptations and modifications may be made without departing from the scope of the following claim.

I claim:

A device for atomizing grease comprising a cylindrical air barrel, the discharge end of said barrel converging to a diameter less than that of the barrel, a nozzle fitted in said discharge end, said nozzle having an opening communicating the interior of said barrel, a grease tube extending coaxially through said barrel and terminating at a point adjacent to but spaced rearwardly from the rear end of said nozzle, the end of said tube adjacent said nozzle opening being chamfered and having a plurality of longitudinally extending grooves on the outer surface thereof with the extreme end of the tube adjacent the nozzle opening having longitudinally projecting saw teeth disposed circumferentially therearound, an air-supply conduit branching from said barrel, a grease-supply conduit connected to said tube, and means at the rear end of said barrel adapted to admit said tube and support it therein.

FRANK T. BARNES.

References Cited in the file of this patent

UNITED STATES PATENTS

| Number | Name | Date |
|---|---|---|
| 992,144 | Babcock | May 16, 1911 |
| 1,104,017 | Szocs | July 21, 1914 |
| 1,377,479 | Hansen | May 10, 1921 |
| 2,012,623 | Boyd | Aug. 27, 1935 |
| 2,102,800 | Killmeyer et al. | Dec. 21, 1937 |
| 2,500,816 | Gird | Mar. 14, 1950 |
| 2,508,766 | Morel | May 23, 1950 |

FOREIGN PATENTS

| Number | Country | Date |
|---|---|---|
| 705,581 | France | Mar. 10, 1931 |